(12) United States Patent
Zheng et al.

(10) Patent No.: US 7,056,546 B2
(45) Date of Patent: *Jun. 6, 2006

(54) STABILIZER-FREE STABILIZED COFFEE AROMA

(75) Inventors: Ying Zheng, Dublin, OH (US); Christian Milo, Epalinges (CH); Pu-Sheng Cheng, Dublin, OH (US); Rachid Rahmani, Marysville, OH (US); Wenjie Hu, Marysville, OH (US)

(73) Assignee: Nestec S.A., Vevey (CH)

( * ) Notice: Subject to any disclaimer, the term of this patent is extended or adjusted under 35 U.S.C. 154(b) by 209 days.

This patent is subject to a terminal disclaimer.

(21) Appl. No.: 10/670,239

(22) Filed: Sep. 26, 2003

(65) Prior Publication Data

US 2004/0137136 A1 Jul. 15, 2004

(30) Foreign Application Priority Data

Sep. 27, 2002 (EP) ............... PCT/EP02/11061

(51) Int. Cl.
*A23L 1/22* (2006.01)

(52) U.S. Cl. ............ 426/534; 426/312; 426/535; 426/537; 426/590; 426/593; 426/594; 426/597; 426/650

(58) Field of Classification Search ........ 426/312, 426/534, 535, 536, 537, 538, 590, 593, 594, 426/595, 597, 599, 650, 654
See application file for complete search history.

(56) References Cited

U.S. PATENT DOCUMENTS

| | | | |
|---|---|---|---|
| 3,164,474 A | 1/1965 | Gianturco et al. | 426/594 |
| 3,421,906 A | 1/1969 | Reich et al. | 426/319 |
| 3,482,987 A | 12/1969 | Feldbrugge et al. | 426/460 |
| 4,041,209 A | 8/1977 | Scholle | 428/500 |
| 4,287,995 A | 9/1981 | Moriya | 215/228 |
| 4,539,216 A | 9/1985 | Tse | 426/597 |
| 4,798,732 A | 1/1989 | Osawa | 426/542 |
| 4,897,273 A | 1/1990 | Kotaki et al. | 426/118 |
| 5,364,555 A | 11/1994 | Zenner et al. | 252/188.28 |
| 5,744,246 A | 4/1998 | Ching | 428/474.4 |
| 5,922,380 A | 7/1999 | Takihara et al. | 426/271 |
| 6,054,162 A | 4/2000 | Bradbury et al. | 426/330.3 |

FOREIGN PATENT DOCUMENTS

| | | |
|---|---|---|
| EP | 0 328 336 | 8/1989 |
| EP | 0 861 596 | 9/1998 |
| EP | 0 934 702 | 8/1999 |
| GB | 640 241 | 7/1950 |
| JP | 62 278948 | 12/1987 |
| WO | WO 95 18540 | 7/1995 |
| WO | WO 96 11861 | 4/1996 |
| WO | WO 02 21938 | 3/2002 |
| WO | WO 02 076237 | 10/2002 |

OTHER PUBLICATIONS

Holscher, W., et al., "Investigations of roasted coffee freshness with an improved headspace technique," *Zeitschrift fuer Lebensmitteluntersuchung und Forschung*, vol. 195, No. 1, pp. 33-38 (1992).

Semmelroch, P., et al., "Analysis of roasted coffee powders and brews by gas chromatography-olfactometry of headspace samples," *Lebensmittel Wissenschaft und Technologie*, vol. 28, No. 3, pp. 310-313, London (1995).

XP002214128: "Additives for coffee to preserve aroma—comprise catalase, glutathione, sulphate, cysteine and antioxidant," DERWENT.

English Abstract, JP 2002281948, "Drink Having Improved Flavor" (2002).

English Abstract,JP 58203865, XP-002268483, "Coffee packaging-by treating with ferrous cpd., alkali or alkaline earth metal hydroxide and alkali metal sulphite" (1984).

English Abstract, , XP-0002268482, "Antiradical efficiency of Maillard reaction mixtures in a hydrophilic media" (2003).

*Primary Examiner*—Leslie Wong
(74) *Attorney, Agent, or Firm*—Winston & Strawn LLP

(57) ABSTRACT

A process for stabilizing an aroma-providing component such as coffee aroma against loss or degradation of its flavor or sensory characteristics by associating the aroma-providing component with a stabilizing agent in an amount effective to reduce or prevent the loss or degradation of the flavor or sensory characteristics of the component and form a stabilized aroma-providing component followed by removing the stabilizing agent from the stabilized coffee aroma prior to packaging for storage or prior to adding the stabilized coffee aroma to a food or beverage product. The resulting stabilized aroma-providing component is essentially free of the stabilizing agent and may be incorporated into a food or beverage product with the initial flavor or sensory characteristics of the stabilized component being retained for a time period of at least two months during storage of the food or beverage product.

50 Claims, No Drawings

STABILIZER-FREE STABILIZED COFFEE AROMA

TECHNICAL FIELD

The invention relates to a process for stabilizing an aroma-providing component of a beverage or foodstuff so that loss or degradation of the flavoring, taste, or other desirable sensory characteristics of the component is inhibited or minimized but without the presence of stabilizers in the component after stabilization. The invention also relates to the stabilizer-free, stabilized aroma-providing component that is obtained by this process. Suitable aroma-providing components include chocolate aroma, tea aroma, Maillard reaction flavor and preferably coffee aroma.

BACKGROUND ART

Flavoring components are utilized in a wide variety of food and beverage products to impart, provide, modify, or improve the flavor or taste to the product. Such components are generally known to be very unstable. Thus, its desirable flavor characteristics can be lost or degraded easily during or after processing or storage over time.

As coffee aroma degrades, it generates unpleasant and non-coffee-like notes that are undesirable. This degradation substantially reduces the perceived quality of the product. For this reason, special attention must be paid to the preparation and storage of flavoring components such as coffee aroma so that either desirable aroma components are preserved or enhanced or undesirable components are reduced or eliminated.

The prior art recognizes that various flavor protective agents can be added to food or beverage products in order to preserve, maintain, or improve the flavor characteristics of such products. For example, it is well known in the art that sulfites can be added to beverages such as beer or wine to preserve the flavor of such beverages. Generally, sulfites act as antioxidants to prevent deterioration of the flavor. For example, sulfites can react with oxygen to prevent deterioration of the flavor of the product due to oxidation of the flavoring component. Also, Japanese patent application 08-196212 discloses the addition of sulfite, catalase, cysteine, or glutathione to a coffee beverage when water is added to reconstitute the beverage to give an improved coffee aroma characteristic.

Instead of adding the sulfites directly to food products, U.S. Pat. Nos. 4,041,209 and 4,536,409 disclose that sulfites may be incorporated into the packaging to prevent absorption of oxygen into the packaged food. Again, oxidation of the flavor component in the whole food matrix is prevented so that the desired flavor of the food is retained for a longer period of time.

U.S. Pat. No. 3,540,889 discloses that methyl mercaptan can be added to an aqueous extract of soluble coffee solids prior to drying the extract to a stable moisture content for improving the flavor of this extract when it is later reconstituted as a coffee beverage. In most illustrations of the prior art, the compound that is added remains in the product to be consumed. For this reason, the use of sulfites or other additives that remain in the food or beverage after such treatments is not a desirable solution to this problem. Thus, there still remains a need for stabilization of volatile flavoring components of plant derived products, such as coffee, in order to preserve their ability to impart the desired flavor, taste and other sensory characteristics to foods to which they are added. The present invention now satisfies this need.

SUMMARY OF THE INVENTION

The invention relates to a process for stabilizing an aroma-providing component against loss or degradation of desirable flavor or sensory characteristics of its aroma during storage. The process comprises contacting the aroma-providing component with a stabilizing agent in a manner such that the stabilizing agent is provided in an amount effective to chemically interact with undesirable compounds associated with the aroma-providing component to form a stabilized aroma-providing component. The stabilized component (a) retains a significant portion of one or more of the desirable flavor or sensory characteristics of the aroma in the aroma-providing component during storage, or (b) reduces off flavor generation during storage of the aroma-providing component. The process can be conducted so that the stabilized aroma-providing component is essentially free of the stabilizing agent when a food or beverage product containing an aroma from the aroma-providing agent is prepared for consumption.

In one embodiment, the stabilizing agent is removed from the stabilized aroma-providing component prior to adding the stabilized aroma-providing component to a food or beverage product. The stabilizing agent can be removed from the stabilized aroma-providing component by distillation, fractionation, precipitation, sublimation, ion-exchange, liquid-liquid extraction (organic or aqueous), aqueous liquid-oil extraction, oil-aqueous liquid extraction, chromatographic separation, or stripping, such as steam stripping.

The aroma-providing component can be stabilized in different ways. One way is by incorporating the stabilizing agent into a material that is added to the aroma-providing component during storage. Thereafter, the material is separable or removable from the aroma-providing component, or the aroma-providing component is separable from the material, before preparation for consumption of a food or beverage product therefrom.

The stabilized aroma-providing component can be formed by contacting the aroma-providing component with a material that contains the stabilizing agent followed by separating the stabilized aroma-providing component from the material. The material that contains the stabilizing agent may be associated with a container for packaging or storing the aroma-providing component prior to use of the component for preparing a food or beverage product.

The aroma-providing component may be treated with a stabilizing agent that interacts with compounds associated with the aroma-providing component to improve or preserve the aroma compounds that can improve the desirable flavor and sensory characteristics of the aroma component and to reduce the amount of compounds that are associated with the undesirable characteristics.

The stabilized aroma-providing component can also be formed by incorporating the stabilizing agent into a material which is added to the aroma-providing component during storage and which further comprises separating the stabilized component from the material when a product for consumption is prepared.

The stabilized aroma-providing component can also be formed by contacting a material that is processed to form the aroma-providing component with the stabilizing agent, followed by separating the stabilized aroma-providing component from the material. A preferred aroma-providing component is coffee and the stabilizing agent can be added to coffee beans prior to or during roasting of the beans to generate an improved coffee aroma.

The stabilizing agent is preferably a compound that contains at least one atom having at least one lone pair of electrons and is present in an amount sufficient to react with undesirable reactive compounds associated with the aroma-providing component to reduce some of the undesirable compounds, or to generate or preserve one or more aroma compounds that contribute to the desirable flavor or sensory characteristics of the aroma or that mask off flavors in the aroma-providing component. The undesirable reactive compounds generally contain carbonyl groups so that the stabilizing agent complexes such compounds to form adducts that are separable from the aroma, resulting in a reduced level of carbonyls in the stabilized aroma-providing component.

The stabilizing agent also cleaves aroma compounds containing disulfide bonds to generate thiols, which are desirable in the final food or beverage products. Also, the undesirable compounds generate or comprise free radicals and the stabilizing agent is present in an amount sufficient to reduce generation of or scavenge such free radicals so that the aroma component is stabilized and preserved.

More preferably, the stabilizing agent is a compound that contains at least one atom having at least one lone pair of electrons. The compound advantageously contains at least one atom of sulfur, nitrogen, oxygen or carbon, such as a sulfite or a substance that contains or generates a sulfite, a thiol, an amine or an amino acid. The stabilizing agent may be a sulfite, cysteine or glutathione or one of their salts, or an immobilized enzyme present in an amount sufficient to react with undesirable compounds associated with the aroma-providing component that reduce its shelf life.

The amount of added stabilizer that is removed during downstream processing or the addition of immobilized agent that is separable from the aroma component is generally in an equivalent to the addition of the agent in an amount between about 1 and 50,000 ppm.

The stabilizing agent may be associated with another additive that acts as a carrier for the stabilizing agent, wherein the carrier is a solvent, an oil, an emulsion, a flavoring agent, a carbohydrate, a protein, or an antioxidant.

The aroma-providing component can be obtained from coffee and the stabilizing agent is added to coffee beans prior to or during roasting, quenching, cooling, or extracting of the beans to generate or isolate an improved coffee aroma. The preferred aroma-providing component is coffee aroma and the stabilizing agent is present in an amount sufficient to react with some or all of the carbonyl compounds associated with the coffee aroma to reduce or inhibit pyrrole loss from the coffee aroma, or to reduce or inhibit degradation of thiols in the coffee aroma, thus retaining the desirable flavor or sensory characteristics of the coffee aroma during at least two months of storage of the coffee aroma. Other preferred aromas include a chocolate or cocoa aroma, tea aroma, malt or Maillard reaction flavor.

The stabilized aroma-providing component may be a liquid that optionally includes an aroma carrier, or the stabilized aroma-providing component may be dried to a powder and stored until a later time when it is reconstituted for consumption by the addition of a liquid. If desired, the stabilized aroma-providing component may be combined with a food-forming or beverage-forming ingredient and a liquid to form a liquid food or beverage product. The liquid product may be further treated by drying. For example, spray-drying or freeze-drying can be applied to obtain a solid material that retains the initial flavor or sensory characteristic of the aroma for a time period of at least two months during storage of the solid material.

The invention also relates to a packaged food or beverage product in the form of a package that contains therein a stabilized aroma-providing component. The stabilized component has preserved or improved desirable flavor or sensory characteristics and is present in an amount sufficient to provide or impart its flavor or sensory characteristics to the product. Preferably, the aroma-providing component is stabilized with a stabilizing agent that is immobilized in, upon or, within the package or upon or within a carrier placed upon or within or forming part of the container such that the stabilizing agent is separable or removable from the aroma-providing component, or the aroma-providing component is separable from the stabilizing agent before preparation for consumption of the food or beverage product. The resulting food or beverage product is essentially free of the stabilizing agent and the loss or degradation of the desirable flavor or sensory characteristics of the stabilized aroma-providing component are reduced or prevented such that it retains its desirable flavor or sensory characteristics during storage of the product for at least two months at ambient or room temperatures. Preferably, the resulting stabilized aroma-providing component has either a ratio of acetaldehyde to methanethiol of less than 200, or at least 30% of the initial amount of acetaldehyde compounds removed, or at least 50% of the initial methanethiol amount preserved during that period of storage. As an example, when the aroma-providing component is a coffee aroma that has an initial concentration of acetaldehyde of between about 40 to 2000 ppm, it generally will have a concentration of acetaldehyde after stabilization of about 1 to 100 ppm.

The stabilizing agent may be immobilized onto an ion-exchange resin with the resin being placed within, attached to or formed as part of the container for the aroma-providing component. The stabilizer may also be immobilized onto or within an insoluble resin that is contacted with the aroma-providing component and subsequently separated from the stabilized aroma-providing component.

In another embodiment, the stabilizing agent may be confined in a pouch made of a semi-permeable material that contains the stabilizing agent, with the pouch being placed within, attached to, or forming part of the container. The stabilizing agent may be provided as a solution that is retained in a semi-permeable pouch that is made of a material that allows carbonyls to permeate therethrough so that they are able to bind with the stabilizing agent and become confined within the pouch rather than in the aroma-providing component.

The food or beverage product or a food-forming or beverage-forming ingredient may be provided in the package along with the aroma-providing agent. A preferred aroma-providing component is coffee aroma and the stabilizing agent is present in an amount sufficient to bind carbonyls in the coffee aroma, remove or reduce carbonyls from the coffee aroma, reduce pyrrole loss from the coffee aroma, or reduce the degradation of thiols in the coffee aroma to thus reduce off flavors in such components.

The invention also relates to certain stabilized coffee aroma-providing components having enhanced and/or preserved desirable flavor or sensory characteristics, such as a ratio of acetaldehyde to methanethiol that is 200 or less during storage over several months at room temperature; (b) an acetaldehyde concentration of 30 to 90 ppm after stabilization of a coffee aroma providing component that initially contains 150 ppm acetaldehyde or more; or (c) an acetaldehyde concentration of 20 to 60 ppm after stabilization of a coffee aroma providing component that initially contains 80 to 100 ppm acetaldehyde. The invention also relates to a packaged food or beverage product in the form of a package that contains therein the stabilized aroma-providing component in an amount sufficient to provide or impart its flavor or sensory characteristics to the product.

DETAILED DESCRIPTION OF THE PREFERRED EMBODIMENTS

As used herein, the term "aroma-providing component" means a substance, material, or compound that is capable of generating or providing an aroma when processed or when prepared as a food or beverage product. This would of course include substances such as coffee beans that are processed in various ways to provide coffee aroma.

As used herein the term "significant portion" is defined as an amount of a desirable aroma, flavor or other organoleptic characteristic that can be sensed or perceived by one who consumes a food or beverage product to which an aroma has been added or incorporated.

As used herein, "coffee aroma" is defined to be the volatile flavor and aroma compounds that are present in coffee products such as roast coffee or coffee extracts. Thus, the invention preferably provides a method to stabilize coffee aroma by contact of the coffee aroma-providing material with a substance that stabilizes or enhances the aroma. As used herein, the term "desirable flavor or sensory characteristics" refers to the flavor, aroma, or other organoleptic properties of a food or beverage product that is reminiscent of a freshly prepared product for consumption.

As used herein, the term "undesirable compounds" refers to the volatile compounds of an aroma-providing component that promote degradation of the other volatile compounds that can contribute to desirable flavor and sensory characteristics.

The association of a stabilizing agent with an aroma-providing component results in a stabilized aroma-providing component that has a number of advantages. First of all, undesirable compounds that are normally present in the aroma-providing component are scavenged by the stabilizing agent. Also, compounds that can detract from the desirable flavor or sensory characteristics react or form adducts or complexes with the stabilizing agent. Generally, these detrimental components are compounds containing carbonyl groups such as aldehydes or diketones.

The stabilizing agent can be reacted with the carbonyls until the proportion of adducted aldehydes is reduced from 30 to 100% of its initial concentration and preferably at least about 50%. This can be measured in the final stabilized component by (a) a ratio of acetaldehyde to methanethiol that is 200 or less during storage over several months at room temperature; (b) an acetaldehyde concentration of 30 to 90 ppm after stabilization of a coffee aroma providing component that initially contains 150 ppm acetaldehyde or more; or (c) an acetaldehyde concentration of 20 to 60 ppm after stabilization of a coffee aroma providing component that initially contains 80 to 100 ppm acetaldehyde. Also, the stabilizing agent can preferably be reacted with the carbonyls until over 50% of initial methanethiol concentrations are maintained in the stabilized product. This can be achieved when the stabilizing agent is immobilized in a package in contact with a coffee aroma providing component that is placed in the package.

The preferred stabilizing agents also act as oxygen/free radical scavengers to prevent deterioration of the flavor characteristics of the coffee aroma due to oxidation from oxygen, free radicals or other oxidizing compounds. The preferred agents can also cleave disulfide bonds to promote levels of thiols that are then preserved by the endogenous antioxidant activity. All together, they ensure the quality of the resulting products to be not only more roasty/sulfury and less woody/green/groundsy/processey but also more stable over time.

While the most preferred aroma is coffee aroma, the aroma-providing component in this invention is intended to be a generic definition of all types of aromas, including chocolate aroma, tea aroma, or other aromas that are derived from or recovered after roasting or cooking of a raw material, and whether in aqueous or water, oil, or emulsion forms, as well as those which are encapsulated, and the like. Also, malt or Maillard reaction flavor can be used.

The principles of the invention are now illustrated for the preferred embodiments where coffee aroma is disclosed as the most preferred aroma-providing component. Coffee aroma is used as a flavoring agent for various foods or beverages and particularly in soluble coffee, coffee concentrate and ready to drink coffee beverages to enhance the flavor, taste, and other sensory characteristics of these beverages.

There are a number of known methods for obtaining coffee aroma, and any can be utilized in this invention. Typical methods include, but are not limited to, standard instant coffee processing in which stripping, gas flushing, or other methods are used to generate and recover the aroma, the collection of gases from the grinding, heating, cooking, or other processing steps, or the extraction of the aroma from any of the processing liquids. Extraction techniques include, but are not limited to, liquid/liquid extraction, $CO_2$ extraction, oil extraction, stripping, distillation, fractionation, flashing, or gas flushing of the processing liquid to obtain the aroma.

As noted above, there are a number of different stabilizing agents that can be used in this invention. These agents generally include any compounds that include one or more atoms that have at least one set of unpaired electrons. Typical atoms that have this property are sulfur or nitrogen although others can be used if desired. The properties of those atoms are commonly defined and known. Preferred stabilizing agents include sulfur dioxide ($SO_2$), sulfites, and compounds that generate or contain thiols, amines, or amino acids. Specifically preferred compounds include any FDA generally regarded as safe (GRAS) sulfiting agent, such as $SO_2$, sodium and potassium sulfites, sodium and potassium metabisulfites, or sodium or potassium bisulfites. Under some conditions, sulfur powder can be used as a suitable stabilizing agent. Sulfur containing amino acids, such as cysteine and homocysteine, whether used alone or in peptides or proteins, are also advantageous, as is glutathione. Materials that contain or generate sulfites, such as yeasts or yeast extracts, or those that generate thiols can also be used.

Nucleophiles such as sulfite and cysteine react with carbonyls, namely reactive aldehydes and α-diketones. In addition, sulfites and cysteine are known antioxidants and free-radical scavengers and are effective for use as stabilizing agents herein. They also cleave disulfides to generate free thiols. Such liberated thiols can impart desirable roasty coffee notes to the aroma or can be used to mask coffee negative notes such as woody, processey or groundsy notes. Due to these endogenous antioxidant activities, the degradation of thiols and pyrroles are reduced or inhibited.

Generally, the stabilizing agent, depending upon its type is indirectly associated with the flavoring component in such a way that the flavoring component is residual free but its effect is in equivalent to a directly added amount of about 1 ppm to 50,000 ppm in the flavoring component. A most preferred agent is sodium sulfite and it is used in an amount equivalent to about 500 ppm to 8,000 ppm. The aroma concentration and its constituents are determined by conventional analytical methods. Generally, a static headspace volatile profile was analyzed using an HP gas chromatograph (GC) equipped with FID and PID detectors and quantified by external standards of compounds of interest. The standards are analyzed in three different pH solutions (4.6, 6, and 7) to compensate for the pH effect on aroma volatility. Methanethiol is quantified by dimethyl sulfide and reported as ppm equivalent of dimethyl sulfide. For the analysis, 10 ml of sample with 2 gram of salt is placed into 20 ml vial. The vial is heated at 80 C for 20 min. and 1-ml loop of the headspace volatile sample is introduced in GC for quantification. The GC is equipped with DB-1 column with a temperature program at 35 C for 1 min and then to 180 C at 4 C/min rate. The total GC run time is 20 min. a static headspace volatile profile was analyzed using an HP gas chromatograph equipped with FID and PID detectors and quantified by external standards of compounds of interest.

The resulting effect from the use of the stabilizing agent has been found to extend the shelf life of coffee aroma so as to allow the aroma, after storage for extended periods of time, to retain a flavor which is reminiscent of freshly brewed coffee in various coffee beverages that are reconstituted after storage of the aroma. Without being bound by theory, it is believed that several mechanisms are occurring to achieve the stability and increased storage life of the fresh flavor, with one or a combination of these mechanisms occurring simultaneously to achieve the improvements:

- the stabilizing agent reacts with carbonyl groups contained in compounds such as aldehydes or diketones to form adducts which do not react with the other coffee aroma compounds to decrease the overall flavor characteristics;
- the stabilizing agent cleaves or reduces disulfide bonds to form thiols and thus preserve the levels of desirable thiols over time; or
- the stabilizing agent acts as an oxygen scavenger to prevent deterioration of the flavor characteristics of the coffee aroma due to oxidation; or
- the stabilizing agent acts as an anti-oxidant to prevent free radicals and other oxidizing compounds from deteriorating the flavor characteristics of the aroma due to oxidation; or
- these endogenous antioxidant activity preserves thiol and pyrrole degradation over time; or
- the stabilizing agent reduces or controls undesirable browning reactions.

In addition, the presence of aldehydes, such as acetaldehyde, causes the desirable flavors to degrade. The stabilizing agent reacts with the aldehyde to form aldehyde derivatives that do not negatively impact the stability of the coffee aroma-providing component. In addition to sulfites and cysteine, C-nucleophiles such as 1,3-dicarbonyl compounds and various thiazolium salts are potentially useful stabilizing agents. For example, thiamin (Vitamin B1) could be immobilized on a resin and then used to react with aldehydes to form aldehyde derivatives that do not deleteriously affect the coffee-aroma providing component.

In conventional non-treated or non-stabilized coffee aroma, the amounts of methanethiol typically diminish to non-detectable levels over the course of two to six months when the components are stored at room temperature. In contrast, the treated or stabilized aroma-providing components of the invention are characterized by a significantly reduced degradation profile compared to the conventional components. The methanethiol levels typically remain at more than 50% of the initial levels and the acetaldehyde to methanethiol ratio is 200 or less after storage at room temperature over a period of at least 2 months.

To illustrate the effect of a stabilizing agent on coffee aroma, 6% sulfite solution was passed through an ion exchange column to load the sulfite onto the ion exchange resin. The sulfite-loaded resin was then placed in a bag that is permeable to coffee aroma solution. The amount of resin relative to the aroma solution was at the ratio of 1:200, 1:175, and 1:150. The resin-providing package was directly packaged with the aroma solution and sealed into cans for storage at room temperature for 2 months. The results show that the amount of acetaldehyde, a substance which is known to adversely affect the flavor or stability properties of coffee aromas, was selectively removed from the aroma by at least 30% while the amount of thiol compounds was enhanced by at least 10%. After ambient storage for 2 months, acetaldehyde was reduced from the aroma by at least 30% and methanethiol was preserved by at least 50% so that the acetaldehyde to methanethiol ratio remained below 200. As thiols provide a desirable roasty note to the aroma, the presence of a greater amount of these compounds imparted a more roasty note to the aroma. Finally, undesirable flavors were also reduced, possibly due to the lower amounts of aldehydes and higher amount of thiols.

The following tables illustrate these changes. Of course, the skilled artisan will recognize that the acetaldehyde and methanethiol contents may be very small and that an accurate ratio cannot be calculated. In those situations, the stabilization can be conducted to remove or reduce acetaldehyde concentration. Preferably, at least 50% of the amount of acetaldehyde is removed. A final acetaldehyde concentration of 30 to 90 ppm is typically achieved after stabilization of a coffee aroma providing component that initially contains 150 ppm acetaldehyde or more, while an acetaldehyde concentration of 20 to 60 ppm is typically achieved after stabilization of a coffee aroma providing component that initially contains 80 to 100 ppm acetaldehyde.

TABLE I

Percentage of static headspace aroma concentration in coffee aroma distillates stored for 2 months at room temperature as compared to the fresh untreated distillate

| | Months | Ctrl | 1:200 in can | 1:175 in can | 1:150 in can |
|---|---|---|---|---|---|
| Methanethiol | 0 | 100 | 138 | 117 | 105 |
| | 2 | 10 | 155 | 121 | 108 |
| Acetaldehyde | 0 | 100 | 61 | 47 | 35 |
| | 2 | 110 | 52 | 56 | 39 |

TABLE 2

Ratio of static headspace concentration of acetaldehyde and methanethiol in coffee aroma distillates stored for 2 months at room temperature

| Months | Control | 1:200 | 1:175 | 1:150 |
|---|---|---|---|---|
| | Ratio: acetaldehyde/methanethiol | | | |
| 0 | 87 | 38 | 35 | 29 |
| 2 | 918 | 29 | 40 | 31 |

Thus, the aroma obtained from the stabilization of an aroma-providing component is characterized as having the following preferred contents of volatile compounds:

Thiols: when present and in a measurable amount, at least as much as or more than original amount after initial treatment and at least 2 months of room temperature storage, and significantly greater than the control, untreated aroma providing component;

Acetaldehyde: decreased by at least 30% to 50% and as much as 60% from the original amount and at all relevant measurement time periods. For example, an initial concentration of acetaldehyde of between about 40 to 2000 ppm can be reduced during stabilization to a final concentration of acetaldehyde after stabilization of about 1 to 100 ppm. Generally, the acetaldehyde concentration is reduced by at least 50% during stabilization.

These compounds are generally present in coffee aroma so that they can be used as markers to determine the effectiveness of the stabilization process or of the particular type of stabilizing agent that is used.

The stabilizing agent may be associated with substances or materials that are or that generate the aroma-providing component by any one of a variety of methods. The following methods are described in connection with the generation of coffee aroma from coffee beans.

For example, coffee beans can be treated with the stabilizing agent at just about any point in the processing of the beans.

After harvesting of the coffee beans, the stabilizing agent can be applied to the green coffee beans by soaking the beans in a solution of the agent, or by spraying the beans with a solution of the agent. These two methods are relatively simple and effective for distributing the agent relatively uniformly throughout the beans. It is also possible to add the agent as a solid, such as a powder, to the beans by mixing the two together. This is a more energy intensive process so that it is not preferred to a simple soaking. One of ordinary skill in the art can determine optimum amounts and concentrations of the agent to use by routine testing. The beans are then roasted to obtain the aroma that is essentially free of additive.

It is alternatively possible to add the agent to the beans during the roasting process. This can be done by adding the agent as a powder or solution into the roasting ovens. Also, the roasting can be conducted in a gaseous atmosphere of the stabilizing agent. Instead of adding the agent to the beans during the roasting process, it is possible to direct the aroma gas that is generated to contact the agent. This can be done by passing the aroma gas through a filter or other carrier in which the agent is incorporated. It is also possible to bubble the aroma gas through a solution of the agent. The aroma can be passed through a fixed or fluidized bed of the agent. As a skilled chemical engineer would realize, the equipment in which this contact occurs is designed to provide a sufficient amount of the agent or a sufficient contact time to produce the enhanced aroma. Finally, the agent can be simply added to the final aroma that is collected.

In these methods, it is generally necessary to utilize a greater amount of stabilizing agent because a portion of the agent is burned off during the roasting step.

Another point where the agent can be contacted with the beans is used as a quenching solution after roasting is completed. This is a particularly effective way to accomplish cooling of the roasted beans as well as utilizing the heat of the roasted beans to accelerate the reaction of the agent with the undesirable compounds in the roasted beans. This also requires no new equipment as the quenching solution is simply modified to carry the agent to the roasted beans. The quenching solution can be sprayed onto the beans or the beans can be dropped into the solution of the agent.

Next, the roasted and cooled beans are subjected to a grinding step, and this step generates coffee aroma. Here, the agent can be added to the beans during the grinding step if not already added with the quenching step or after it. Again, the agent can be added in solid or liquid form, or the grinding can be carried out in an atmosphere of the agent in gaseous form. Alternatively, it is possible to direct the aroma gas that is generated during the grinding step to contact the agent. This can be done by passing the aroma through a filter or other carrier in which the agent is incorporated. It is also possible to bubble the aroma gas through a solution of the agent. As noted above in the discussion of the aroma created by roasting the beans, the grinding aroma can be passed through a fixed or fluidized bed of the agent.

The roast and ground coffee is typically processed for obtaining the aroma component that is additive free. For example, the particles are typically extracted with water to form a solution, volatiles are stripped from the solution with steam, and the stripped volatiles are collected and concentrated. In these processes, the aroma stabilizer agent can also be added to the extraction water. The agent can be added at one or more of these steps for optimum results.

When sulfites are used, an appropriate dosage range would be that which provides an equivalent to the direct addition of about 1 ppm to 50,000 ppm of sulfite per unit weight of aroma or aroma distillate. Preferably, the ratio of sodium sulfite to aroma volatile compounds is preferably from about 8:1 to 16:1. Depending upon the specific stabilizing agent used, these amounts can vary but the optimum amounts can be readily determined by one of ordinary skill in the art through routine testing.

As noted above, the stabilizing agent can be associated with or added to coffee or the aroma-providing component as a powder, liquid, or as a gas, depending upon the form or the aroma-providing component. The stabilizing agent may be simply added to any of these materials, streams, or additives or the materials, streams, or additives can be treated by passing them over the stabilizing agent in immobilized form as disclosed herein. Depending upon the specific point in the process where it is added, the stabilizing agent can be prepared in a form that allows it to be separated or removed from the processed material. For example, the stabilizing agent can be a gas that contacts an aroma-providing component in solid form during treatment but which is removed from the processed material. Where liquid or gaseous aroma-providing components are treated in other processing steps, the stabilizing agent can be provided in a solid form and then immobilized in a resin or a pouch made of a plastic film or other material that is permeable to the gaseous or liquid component but which prevents egress of the solid stabilizing agent into the liquid or gas.

The treatment of the aroma-providing component with the stabilizing agent is conducted for a time sufficient to form reaction products of the stabilizing agent and undesirable volatiles in the aroma-providing component. For coffee aroma, as noted above, such undesirable volatiles include aldehydes and diketones, and the stabilizing agent reacts with such volatiles to form adducts or other reaction products that block these volatiles and prevent or at least reduce the reactivity of as well as the opportunity for those volatiles to react with other, useful volatiles that provide or impart the desirable flavor, taste and other sensory characteristics to the food or beverage products to which the aroma-providing component is added. One of ordinary skill in the art can readily determine by routine testing the appropriate time periods for treatment of the aroma-providing agent to provide the desired level of stabilization.

As the reaction products formed by the stabilizing agent and the undesirable volatile compounds in the aroma-providing component are different in properties from the remaining desirable volatile components of the aroma-providing component, these reaction products can be easily removed. Any one of a number of methods, such as distillation, fractionation, precipitation, sublimation, ion-exchange, liquid-liquid extraction (organic or aqueous), aqueous liquid-oil extraction, oil-aqueous liquid extraction, or even chromatographic separation, are suitable for separating and removing these reaction products from the aroma-providing component. For example, for treatment of coffee aroma with sulfites, the resultant sulfite-carbonyl adduct is not volatile and can be easily separated by a simple distillation from the remaining coffee aroma volatiles.

Also, other processes can be used to separate the desirable volatiles of the aroma-providing component from the undesirable reaction products. For sulfite stabilized coffee aroma, a simple heating step, such as steam stripping at low or high temperatures, can be used to separate the desirable volatiles from the sulfite-carbonyl adducts. Higher temperature steam stripping results in essentially no residual amounts of stabilizing agent or adducts, but it can decompose some of the adducts to liberate undesirable volatiles. Lower temperature steam stripping is desirable since less of the adducts decompose. The skilled artisan can select heating processes and heating temperatures to achieve the desired characteristics and content of volatiles of the final aroma-providing component.

Another desirable application of different forms of the components can be utilized when the aroma-providing component is a liquid or gas and the stabilizing agent is a solid. The stabilizing agent can be incorporated onto a support, such as a membrane or filter, and the aroma-providing component can be directed to pass adjacent to, around, or even through the membrane or filter. Typical materials for such membranes and filters include permeable plastics into or upon which the stabilizing agent is incorporated, coated or otherwise associated. It is also possible to configure solid stabilizing agents in the form of porous materials through or around which the gaseous or liquid aroma-providing component will pass to achieve the desired adducting or scavenging results.

The stabilizing agent can be immobilized onto an insoluble material that can be contacted with the aroma-providing component to remove undesirable aroma compounds and stabilize the component, and then removed prior to the packaging of the aroma component for storage. The process can also be conducted so that the stabilizing agent is immobilized inside or within the container that is used to retain the aroma component in such a way that allows interaction between the stabilizer and the aroma component. The stabilized aroma-providing component may be prepared by incorporating the stabilizing agent into a material which is added to the aroma-providing component during storage but which material is separable or removable from the aroma-providing component, or the aroma-providing component is separable from the material, before preparation for consumption of a food or beverage product therefrom.

The stabilizing agent can be immobilized onto a matrix or confined within a compartment made from semi-permeable films. Such immobilized/confined agents can be stored in contact with the aroma-providing component as a part of the package or within the aroma-providing component and are separable prior to beverage preparation.

The stabilizing agent may be in the form of a solid that is immobilized upon or into a matrix or confined within a compartment made of a semi-permeable membrane or film with the matrix or the pouch being placed within, attached to or forming part of the container. Other forms of the stabilizing agent, such as a liquid or gas, can be immobilized by being packaged in the container with the aroma-providing component. Also, a food or beverage product or a food-forming or beverage-forming ingredient can be provided in the package along with the aroma-providing agent so that the final product can be prepared by simply opening the container, optionally with the addition of a liquid such as milk or water.

Yet another arrangement is the positioning or immobilization of one component and the passage of the other therearound, thereover or therethrough. In one version of this embodiment, the stabilizing agent such as sulfite or cysteine is immobilized and provided as a sheet, film, block, insert, powder, mass or other structure for contact with the aroma-providing component as they move past, around and through each other. For example, stabilizing agent can be added to the aroma-providing component for a time sufficient to achieve the desired adducting or scavenging and then can be separated from the stabilized aroma-providing component.

Alternatively, and in most cases preferably, the stabilizing agent can be incorporated into the package or container which is to be used to separately store the aroma-providing component, thus achieving the desired adducting or scavenging during storage by simply placing the aroma-providing component into the package or container. The stabilizing agent can be simply placed in the compartment in the form of a small permeable pouch, such as a "tea bag" or other permeable enclosure, or it can be incorporated in a separate compartment which can be permeated by the aroma-providing component but which compartment retains the stabilizer therein so that it cannot exit the container or package when the stabilized aroma-providing component is added to the food or beverage product.

In a specific arrangement, the stabilizing agent is added to the aroma-providing component in a form that is not soluble in that component, and a screen membrane or filter is used to retain the stabilizing agent in the package when the stabilized aroma-providing component is removed.

In another arrangement, the stabilizing agent can be incorporated into one or more interior surfaces of the container or package for contact with the aroma-providing component during storage therein. This is advantageous because the stabilized aroma-providing component can be removed from the package or container without having to separate or isolate the stabilizing agent from it prior to use in preparing the food or beverage product for consumption.

Alternatively, instead of immobilizing the stabilizing agent in a carrier or in the container, it is possible to instead construct the container so that the aroma-providing component is separated from the stabilizing agent, and the undesirable compounds associated with the aroma-providing component diffuse into or otherwise come in contact with the stabilizing agent for removal from the aroma-providing component. While this is a less preferred arrangement, it is entirely within the level of the skilled artisan as another possibility of use for the present invention.

The resultant stabilized aroma-providing component is essentially free of the stabilizing agent. "Essentially free" means that the stabilized aroma-providing component contains less than 10 ppm of stabilizing agent that was originally added to the aroma-providing agent during the stabilizing treatment. In addition when a food or beverage product containing an aroma from the aroma-providing agent is prepared for consumption, it also will be essentially free of the stabilizing agent.

Of course, the skilled artisan will readily understand that food or beverage products are prepared in this condition prior to consumption as it is possible for the stabilizing agent, whether immobilized on a support or not, to remain in contact with the aroma-providing component or the food or beverage product until just prior to consumption. In preferred embodiments, the stabilizing agent is not allowed to directly contact the food or beverage product, as it is first separated or recovered from the aroma-providing component before forming the food or beverage component. As shown below in the examples, coffee aroma in the form of a liquid distillate can be packaged with sulfite solution confined within a plastic pouch so that the aroma is stabilized during storage, but the sulfite can not egress out from the pouch and the distillate can be separated from the pouch or sachet prior to formation of the beverage for consumption.

In conventional non-treated or non-stabilized coffee aroma, the amounts of methanethiol diminishes to non-detectable levels over the course of about 2 to 6 months when the components are stored at room temperature.

In contrast, the treated or stabilized aroma-providing components, that are stored with the stabilizer immobilized onto resins and at room temperature for 2 months, are characterized by a significantly reduced degradation profile compared to the conventional components. The methanethiol level remains at at least 50% as compared to the one stored at ambient. After removal of the stabilizing agent and reaction products and being subject to room temperature storage, the stabilizing agent-free stabilized aroma-providing components are characterized by a reduced degradation profile compared to the conventional components but one that is not as reduced as when the stabilizing agent is not removed but remains in direct contact with the aroma-providing component.

Also, when conventional high temperature steam stripping is used to remove the desirable volatiles of coffee aroma from the adducts, some dissociation of the adducts is observed. In comparison, when conventional low temperature vacuum steam stripping is used to remove the desirable volatiles of the coffee aroma from the adducts that are generated due to the treatment of the coffee aroma with sodium sulfite, for example, much less dissociation of the adducts is observed.

It has been found that the enhanced aroma-providing component or the stabilizing agent and aroma-providing component combination can be stored at room temperature for extended periods of time without much reduced loss of the desirable aroma at the time when the product is made for consumption. For certain aromas, the desirable aroma notes can be retained in the aroma-providing component during storage since the undesirable odor or flavor notes are adducted or reduced by the agent. The maintenance of the desirable notes for a period of at least two to six months and even longer is easily achieved for coffee aroma with similar benefits obtainable for other aromas.

For maintaining these stabilized or superior aroma characteristics for even longer times, storage at temperatures below ambient can be used. Temperatures as low as 10° C., or even 0° C. or lower can be used for this purpose. Generally, storage stability for more than one year at room temperature is sufficient for many aroma-providing components so that lower temperature storage is not necessary. The person of ordinary skill in the art can determine by routine testing the optimum storage temperature for retaining the effective aroma characteristics for the desired time periods depending upon the specific aroma-providing component, stabilizing agent, and desired aroma properties after storage.

The time of treatment of the aroma-providing component and the stabilizing agent is also a consideration. Also, the relative amounts of stabilizing agent and aroma-providing component play a factor in this. Of course, the more stabilizing agent and the longer treatment times that are used, the more carbonyl groups form adducts and the more oxygen or free radicals are scavenged. Depending upon the intended results, it may not be necessary to remove all of the oxygen and free radicals, nor to adduct all of the carbonyls. Again, one of ordinary skill in the art can best select the relative amounts of the components, the treatment times and the storage temperatures so that the treated aroma-providing component can provide the optimum flavor characteristics to the intended product at the eventual time of use.

The form of the stabilized aroma-providing product represents another feature of the invention. While any form can be used, components in a gaseous form present additional handling considerations. While this may present less of a problem in a commercial setting, such as a cafe or restaurant where coffee is purchased for relatively immediate consumption, it may not be as desirable for home use as the dispensation of a gas into a liquid is not trivial. Thus, solid or liquid forms of the stabilized aroma-providing component are typically used.

The provision of the stabilized aroma-providing component as a powder can be achieved in a number of ways. When the treated aroma-providing component is a liquid, it can readily be converted into a solid by conventional drying techniques such as spray drying or freeze drying. In this regard, it is highly desirable to conduct the spray drying or freeze drying operation on a solution of stabilized aroma-providing component as soon as possible after treatment by the stabilizing agent so that as much of the aroma in the aroma-providing component can be retained. If desired, the particle size of the spray-dried or freeze-dried powder can be varied by grinding or pulverization, with the size that is most desirable being one that readily dissolves (i.e., within one minute and preferably within 15–30 seconds) after being added to the fluid used to form the consumable product.

The stabilized aroma component may also be incorporated in a matrix of oil, water, or other solvents, provided as an emulsion, encapsulated in other edible materials by techniques that are generally known in the art, may be frozen as a frost or dried to powder form prior to storage.

EXAMPLES

The following examples are presented to illustrate the most preferred embodiments of the invention.

Example 1

A roast and ground ("R&G") coffee is extracted with water. The resulting liquid stream that includes soluble coffee is passed through a steam stripping column where the volatile flavor/aroma components are distilled out, condensed and collected. The non-volatile components can be utilized as is or, if desired, can be further processed such as by evaporation to higher solids contents for shelf stable uses.

For every 1000 g of R&G coffee sent to the extraction process, 800 g of aroma distillate are collected and rectified to 150 g aroma distillate (aroma A). The aroma distillate was further diluted to 750 g using deoxygenated reverse osmosis water (aroma B). The resulting aroma B solution is stored in a sealed container that prevents the aroma from permeating out and that prevents oxygen from entering.

Concentrated coffee solids are prepared and stored separately from the distillate with addition of NaOH. Both are stored at room temperature for a period of 6 months. In order to prepare a beverage for consumption, the coffee solids are then mixed with the distillate and hot water is added to the mixture. Upon consumption, the resulting beverage is found to have noticeable off flavors.

Example 2

6% sulfite solution was passed through an ion exchange column to load the ion exchange resins (Dowex 22) with sulfite. The sulfite loaded resin was placed in a tea bag type package at the ratio of 1:200 of resin relative to amount of aroma solution and the resulted package was further placed within aroma B solution. The final aroma-providing component was stored at room temperature condition for 6 months and kept the acetaldehyde to methanethiol ratio typically between 15 and 75. The coffee solids were mixed with NaOH and canned and stored also for 6 months at room temperature. The coffee solids were then mixed with the distillate and hot water was added to the mixture to form a beverage.

Upon consumption, the resulting beverage is found to have a flavor that is fresher than Example 1 and with a significantly reduced level of undesirable flavors.

Example 3

The sulfite-loaded resin was packed into a column. Aroma B solution was passed through this column and collected into a hermetically sealed container. This aroma providing component with about 95% acetaldehyde reduced was further stored at 37° C. for 8 to 12 weeks. After storage, the aroma component maintained the acetaldehyde to methanethiol ratio typically between 5 and 30. Upon consumption, the resulting beverage is found to have a flavor that is perceived to be fresher than sample from Example 1.

Example 4

Aroma A solution was added with 2500 ppm SO2 equivalent of sodium sulfite and stored overnight. The sulfite added distillate was passed through a stripping column under vacuum and the aroma component was collected free of sulfite with about 60% of acetaldehyde removed from the product stream. The collected aroma was further diluted down five times using deoxygenated reverse osmosis water. The final aroma-providing component was stored at room temperature for six months. The resulting beverage is found to have a flavor that is perceived to be fresher than the sample from Example 1.

Example 5

Sodium sulfite is dissolved in water to form 1.2% aqueous solution. A low-density polypropylene film is formed into a pouch and the sulfite solution is placed and sealed within the pouch. The pouch is placed in the container containing aroma B solution and the container is then sealed. The amount of sulfite solution is about 5% of the aroma solution. The hydrophobic nature of the polypropylene prevents permeation of the sodium sulfite therethrough, but the coffee aroma diffuses through the polypropylene pouch walls to contact the sodium sulfite solution during storage at room temperature for a period of 6 months. Due to the nucleophilic effect of sulfite in the pouch, the carbonyls permeated into the pouch became partly bound with sulfite solution inside the pouch. As a result, at least 30% of acetaldehyde, for example, was confined within the pouch in the sulfite solution and thus removed from the aroma component solution.

Coffee solids are stored at room temperature separately from the distillate but for the same time period. The coffee solids are then mixed with the distillate and hot water is added to the mixture to form a beverage. Upon consumption, the resulting beverage is found to have a flavor that is fresher than Example 1.

Example 6

Aroma A solution was added with 2500 ppm SO$_2$ equivalent of sodium sulfite and then passed through a liquid-liquid extraction column using coffee oil or another oil such as a medium chain fatty acid oil as extraction medium. The resulting oil contains aroma component without the presence of sulfite. This aroma-loaded oil was encapsulated or directly used to flavor coffee soluble powder or stored at room temperature for 6 months prior to re-constitution back to coffee beverage. The resulted beverage is found to have a fresher flavor than the one without the stabilization process.

Example 7

The stabilizing agent-free coffee aroma can be encapsulated to form capsules that are stable and easy to handle so that they can be added to the coffee solids at any time prior to or after formation of a beverage but prior to consumption.

Example 8

Various food products, including powdered coffee mixes, ready to drink beverages, ice-cream, and candy, can be formulated with the stabilized coffee aroma.

Example 9

For every 1000 g of R&G coffee, 150 g of aroma distillate was collected and then diluted to 1200 g using deoxygenated reverse osmosis water (aroma C, with acetaldehyde typically less than 100 ppm). A 6% sulfite solution was passed through an ion exchange column to load the ion exchange resins (Dowex 22) with sulfite. The aroma C solution was passed through this column and collected.

Alternatively, the sulfite loaded resin was mixed with aroma C solution at the ratio of 1:30–50 of resin relative to amount of aroma C solution for one day and then removed from the distillate. The treated distillate with at least 60% acetaldehyde reduced was packaged into a hermetically sealed container and stored at room temperature condition for 2 months. fter storage, the distillate kept the acetaldehyde to methanethiol ratio typically between 15 and 75 and/or acetaldehyde to N-m-pyrrole ratio typically less than 30.

The coffee solids were mixed with NaOH and canned and stored also for 2 months at room temperature. The coffee solids were then mixed with the distillate and hot water was added to the mixture to form a beverage. Upon consumption, the resulting beverage is found to have a flavor that is fresher than Example 1 and with a significantly reduced level of undesirable flavors.

While the preceding examples were specifically directed to the treatment and stabilization of coffee aroma, it will be immediately realized by one of ordinary skill in the art that aroma distillates from other sources as well as other aroma-providing components that contain thiols, aldehydes and pyrroles may be treated in essentially the same manner in order to be stabilized as disclosed herein. Also, the stabilized aroma-providing components can be added to any one of a wide variety of food or beverage products whether such products are consumed at room temperature, are cooled or frozen or after heating. Typical products include coffee powders, ready to drink beverage mixes, candy, cake frosting or ice cream along with many others that are limited only by the imagination and creativity of the product formulator.

The term "about," as used herein, should generally be understood to refer to both numbers in a range of numerals. Moreover, all numerical ranges herein should be understood to include each whole integer within the range.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A process for stabilizing an aroma-providing component against loss or degradation of desirable flavor or sensory characteristics of its aroma during storage which comprises providing a stabilizing agent of a nucleophile that contains at least one lone pair of electrons for reaction, contacting the stabilizing agent with an aroma-providing component that is isolated, concentrated or separated from a food, beverage, food-forming or beverage-forming material, with the contacting being made in a manner such that the stabilizing agent is provided in an amount effective to chemically interact with undesirable compounds associated with the aroma-providing component to form a stabilized aroma-providing component which: (a) retains a significant portion of one or more of the desirable flavor or sensory characteristics of the aroma in the aroma-providing component during storage, or (b) reduces off flavor generation during storage of the aroma-providing component, and separately storing (i) the stabilized aroma-providing component or (ii) the aroma-providing component in contact with the stabilizing agent, so that the stabilized aroma-providing component is essentially free of the stabilizing agent when removed from storage for preparing a food or beverage product for consumption, and the aroma-providing component imparts to the product an improved or enhanced aroma compared to the aroma provided by an unstabilized aroma-providing component.

2. The process of claim 1, wherein the stabilizing agent is removed from the stabilized aroma-providing component prior to adding the stabilized aroma-providing component to a food or beverage product.

3. The process of claim 2 wherein the stabilizing agent is removed from the stabilized aroma-providing component by distillation, fractionation, precipitation, sublimation, ion-exchange, liquid-liquid extraction (organic or aqueous), aqueous liquid-oil extraction, oil-aqueous liquid extraction, chromatographic separation, or stripping.

4. The process of claim 3, which further comprises packing a column with the stabilizing agent and passing the aroma-providing agent through the column to stabilize the aroma-providing component.

5. The process of claim 3, which further comprises contacting the aroma-providing agent with the stabilizing agent to form a mixture, passing the mixture through a stripping column, optionally under vacuum, and collecting the stabilized aroma-providing component in a form where it is free of the stabilizing agent.

6. The process of claim 3, which further comprises contacting the aroma-providing agent with the stabilizing agent to form a mixture, passing the mixture through a liquid-liquid extraction column using coffee oil or another oil solvent as an extraction medium, and collecting the stabilized aroma-providing component in a form where it is free of the stabilizing agent.

7. The process of claim 1, wherein the stabilized aroma-providing component is prepared by incorporating the stabilizing agent into a material which is added to the aroma-providing component during storage but which material is separable or removable from the aroma-providing component, or the aroma-providing component is separable from the material, before preparation for consumption of a food or beverage product therefrom.

8. The process of claim 1, wherein the stabilized aroma-providing component is formed by contacting the aroma-providing component with a material that contains the stabilizing agent followed by separating the stabilized aroma-providing component from the material.

9. The process of claim 8, wherein the material that contains the stabilizing agent is associated with a container for packaging or storing the aroma-providing component prior to use of the component for preparing a food or beverage product.

10. The process of claim 1 wherein the aroma-providing component is treated with a stabilizing agent that interacts with compounds associated with the aroma-providing component to improve or preserve the aroma compounds that can improve the desirable flavor and sensory characteristics of the aroma component and to reduce the amount of compounds that are associated with the undesirable characteristics.

11. The process of claim 1, wherein the stabilized aroma-providing component is formed by incorporating the stabilizing agent into a material which is added to the aroma-providing component during storage and which further comprises separating the stabilized component from the material when a product for consumption is prepared.

12. The process of claim 1, wherein the stabilized aroma-providing component is formed by contacting a material that is processed to form the aroma-providing component with the stabilizing agent, followed by separating the stabilized aroma-providing component from the material.

13. The process of claim 12, wherein the aroma-providing component is obtained from coffee and the stabilizing agent is added to coffee beans prior to or during roasting, quenching, cooling, or extracting of the beans to generate or isolate an improved coffee aroma.

14. The process of claim 1, wherein the nucleophile contains least one atom of sulfur or nitrogen for providing the at least one lone pair of electrons and the stabilizing agent is present in an amount sufficient to react with some of the undesirable reactive compounds associated with the aroma-providing component to reduce some of the undesirable compounds, or to generate or preserve one or more aroma compounds that contribute to the desirable flavor or sensory characteristics of the aroma or that mask off flavors in the aroma-providing component.

15. The process of claim 14, wherein the undesirable reactive compounds contain carbonyl groups and the stabilizing agent complexes such compounds to form adducts that are separable from the aroma, resulting in a reduced level of carbonyls in the stabilized aroma-providing component, or the undesirable compounds generate or comprise free radicals and the stabilizing agent is present in an amount sufficient to reduce generation of or scavenge such free radicals so that the aroma component is stabilized and preserved.

16. The process of claim 14, wherein the stabilizing agent cleaves the aroma compounds containing disulfide bonds to generate or regenerate thiols that contribute to the desirable flavor and sensory characteristics of the aroma-providing component.

17. The process of claim 1, wherein the stabilizing agent is a compound that contains at least one atom of sulfur or nitrogen and is used in an amount of between about 1 and 50,000 ppm.

18. The process of claim 1, wherein the stabilizing agent is a sulfite or a substance that contains or generates a sulfite, a thiol, an amine, an amino acid, or peptide and is used in an amount of between about 1 and 50,000 ppm.

19. The process of claim 18, wherein the stabilizing agent comprises a sulfite, cysteine or glutathione or their salts or materials containing such, or an enzyme present in an amount sufficient to react with carbonyls associated with the aroma-providing component.

20. The process of claim 18, wherein the stabilizing agent comprises a sulfite, cysteine or glutathione or their salts or materials containing such and they are present in an amount sufficient to exhibit sufficient reducing power to scavenge free radicals and to preserve sulfur aroma compounds in the aroma-providing component from oxidative degradation.

21. The process of claim 1, wherein the stabilizing agent is associated with another additive that acts as a carrier for the stabilizing agent, wherein the carrier is a solvent, an oil, an emulsion, a flavoring agent, a carbohydrate, a protein, or an antioxidant.

22. The process of claim 1, wherein the aroma-providing component is coffee aroma and the stabilizing agent is present in an amount sufficient to react with some or all of the carbonyl groups present in compounds associated with the coffee aroma to generate or regenerate thiols or to reduce or inhibit degradation of thiols in the coffee aroma, thus retaining the desirable flavor or sensory characteristics of the coffee aroma during at least two months of storage of the coffee aroma.

23. The process of claim 1, wherein the aroma is one of a chocolate or cocoa aroma, tea aroma, malt or Maillard reaction flavor.

24. The process of claim 1, wherein the stabilized aroma-providing component is a liquid that optionally includes an aroma carrier, or the stabilized aroma-providing component is dried to a powder and is stored until a later time when it is reconstituted for consumption by the addition of a liquid.

25. The process of claim 1, which further comprises combining the stabilized aroma-providing component with a food-forming or beverage-forming ingredient and optionally with a liquid to form a liquid food or beverage product, and drying the product by spray-drying or freeze-drying to obtain a solid material that retains the initial flavor or sensory characteristic of the aroma for a time period of at least two months during storage of the solid material.

26. A packaged food or beverage product in the form of a package that contains therein a stabilized aroma-providing component having preserved or improved desirable flavor or sensory characteristics and being present in an amount sufficient to provide or impart its flavor or sensory characteristics to the product, wherein the aroma-providing component is isolated, concentrated or separated from a food, beverage, food-forming or beverage-forming material and is stabilized with a stabilizing agent that is immobilized in, upon or within the package or upon or within a carrier placed upon or within or forming part of the container such that the stabilizing agent is readily separable or removable from the aroma-providing component, or the aroma-providing component is readily separable from the stabilizing agent before combining the stabilized aroma-providing component with a further component of a food, beverage, food-forming or beverage-forming material and optionally with a liquid to form a product for consumption, wherein the food or beverage product is essentially free of the stabilizing agent when the product is prepared for consumption and further wherein the loss or degradation of the desirable flavor or sensory characteristics of the stabilized aroma-providing component are reduced or prevented during storage such that the aroma-providing component retains its desirable flavor or sensory characteristics during an extended periods of storage at room temperatures.

27. The product of claim 26, wherein the stabilizing agent is immobilized onto ion-exchange resins and the resins are placed within, attached to or formed as part of the container for the aroma-providing component.

28. The product of claim 26, wherein the stabilizer is immobilized onto or within an insoluble matrix which is contacted with the aroma-providing component and subsequently separated from the stabilized aroma-providing component.

29. The product of claim 26, wherein the stabilizing agent is confined in a pouch made of a semi-permeable material that contains the stabilizing agent, and the pouch is placed within, attached to or forms part of the container.

30. The product of claim 29, the stabilizing agent is solution that is retained in the pouch and wherein the semi-permeable pouch is made of a material that allows carbonyls to permeate therethrough so that they are able to bind with the stabilizing agent and become at least partly confined within the pouch rather than in the aroma-providing component.

31. The product of claim 26, wherein aroma is coffee aroma and the aroma providing component has one of the following features: (a) a ratio of acetaldehyde to methanethiol that is 200 or less during storage over several months at room temperature; (b) an acetaldehyde concentration of 30 to 90 ppm after stabilization of a coffee aroma providing component that initially contains 150 ppm acetaldehyde or more; or (c) an acetaldehyde concentration of 20 to 60 ppm after stabilization of a coffee aroma providing component that initially contains 80 to 100 ppm acetaldehyde.

32. The product of claim 26, wherein a food or beverage product or a food-forming or beverage-forming ingredient is provided in the package along with the aroma-providing agent.

33. The product of claim 26, wherein the aroma-providing component is coffee aroma and the stabilizing agent is present in an amount sufficient to adduct carbonyls in the coffee aroma, remove or reduce carbonyls from the coffee aroma, or reduce the degradation of thiols in the coffee aroma.

34. The product of claim 26, wherein the aroma-providing component is a coffee aroma that has an initial concentration of acetaldehyde of about 40 to 2000 ppm but a concentration of acetaldehyde after stabilization of about 1 to 100 ppm wherein the acetaldehyde concentration is reduced by at least 50% during stabilization.

35. A stabilized aroma-providing component having enhanced and/or preserved desirable flavor or sensory characteristics and being sufficient to provide or impart flavor or sensory characteristics to its intended products, the component being isolated, concentrated or separated from a food, beverage, food-forming or beverage-forming material and stabilized with a stabilizing agent that is removed prior to the packaging or is immobilized in, upon or within the package or upon or within a carrier that is placed upon or within the container such that the stabilizing agent is readily separable or removable from the aroma-providing component, or the aroma-providing component is readily separable from the stabilizing agent, before combining the stabilized aroma-providing component with a further component of a food, beverage, food-forming or beverage-forming material and optionally with a liquid to form a product wherein the food or beverage product is essentially free of the stabilizing agent and further wherein the loss or degradation of the desirable flavor or sensory characteristics of the stabilized aroma-providing component are reduced or prevented during storage such that it retains its desirable flavor or sensory characteristics during storage of the product for an extended period of time at ambient or room temperatures.

36. A stabilized coffee aroma-providing component that has one of the following features: (a) a ratio of acetaldehyde to methanethiol that is 200 or less during storage over several months at room temperature; (b) an acetaldehyde concentration of 30 to 90 ppm after stabilization of a coffee aroma providing component that initially contains 150 ppm acetaldehyde or more; or (c) an acetaldehyde concentration of 20 to 60 ppm after stabilization of a coffee aroma providing component that initially contains 80 to 100 ppm acetaldehyde.

37. The stabilized coffee aroma-providing component of claim 36 having an initial concentration of acetaldehyde of between about 40 to 2000 ppm but a concentration of acetaldehyde after stabilization of about 1 to 100 ppm wherein the acetaldehyde concentration is reduced by at least 50% during stabilization.

38. A packaged food or beverage product in the form of a package that contains therein the stabilized coffee aroma-providing component of claim 36 in an amount sufficient to provide or impart its flavor or sensory characteristics to the product.

39. The product of claim 26, wherein the aroma-providing component is obtained from a food or beverage product or precursor, the stabilized aroma-providing component is separately stored from a food-forming or beverage-forming component so that the separately stored stabilized aroma component can be combined with the food-forming or beverage-forming component to form a food or beverage product just prior to consumption.

40. The product of claim 39 wherein the aroma-providing component is a coffee aroma which (a) contains a ratio of acetaldehyde to methanethiol that is 200 or less during storage over several months at room temperature; (b) has an initial concentration of acetaldehyde of about 40 to 2000 ppm but a concentration of acetaldehyde after stabilization and storage of about 1 to 100 ppm, wherein the acetaldehyde concentration is reduced by at least 50% during stabilization and storage.

41. The product of claim 32 wherein the beverage-forming ingredient comprises concentrated coffee, tea, juice, milk, chocolate or cocoa, of a non-dairy creamer-based compound or a combination thereof.

42. The product of claim 26 wherein the food-forming or beverage-forming ingredient comprises concentrated coffee, tea, juice, milk, chocolate or cocoa, or a non-dairy creamer-based compound or a combination thereof.

43. The product of claim 35 wherein the food-forming or beverage-forming ingredient comprises concentrated coffee, tea, juice, milk, chocolate or cocoa, or a non-dairy creamer-based compound or a combination thereof.

44. The product of claim 26 where the food-forming or beverage-forming ingredient is a coffee-based concentrate that includes coffee solids and sodium hydroxide in an amount sufficient to increase the pH of the concentrate.

45. The product of claim 35 where the food-forming or beverage-forming ingredient is a coffee-based concentrate that includes coffee solids and sodium hydroxide in an amount sufficient to increase the pH of the concentrate.

46. The product of claim 35 wherein the stabilized aroma-providing ingredient is isolated in the package by the food-forming or beverage-forming ingredient being stored in a separate compartment of the package or being stored in a container separate from but associated with the package.

47. The product of claim 36 wherein the stabilized aroma-providing ingredient is isolated in the package by the food-forming or beverage-forming ingredient being stored in a separate compartment of the package or being stored in a container separate from but associated with the package.

48. The product of claim 47 wherein the food-forming or beverage-forming ingredient comprises concentrated coffee, tea, juice, milk, chocolate or cocoa, or a non-dairy creamer-based compound or a combination thereof.

49. The product of claim 47 where the food-forming or beverage-forming ingredient is a coffee-based concentrate that ingredient is a coffee-based concentrate that includes coffee solids and sodium hydroxide in an amount sufficient to increase the pH of the concentrate.

50. The process of claim 1, which further comprises obtaining the aroma-providing component from a food or beverage product or precursor, separately storing the stabilized aroma-providing component from a food-forming or beverage-forming component and combining the separately stored stabilized aroma component with the food-forming or beverage-forming component to form a food or beverage product just prior to consumption.

* * * * *